United States Patent [19]
Probst

[11] Patent Number: 4,971,045
[45] Date of Patent: Nov. 20, 1990

[54] PORTABLE, COLLAPSIBLE WOOD BURNING STOVE AND USES FOR THE SAME

[76] Inventor: Glen W. Probst, 380 N. 1200 East, Orem, Utah 84057

[21] Appl. No.: 452,005

[22] Filed: Dec. 18, 1989

[51] Int. Cl.$^5$ .............................................. F24B 3/00
[52] U.S. Cl. .................................. 126/65; 126/9 R; 126/9 B; 126/29
[58] Field of Search ............... 126/65, 9 R, 9 A, 9 B, 126/25 R, 29, 38

[56] References Cited

U.S. PATENT DOCUMENTS

| | | | |
|---|---|---|---|
| 1,050,113 | 1/1913 | Eichelkraut | 126/9 B |
| 2,965,097 | 12/1960 | Clark, Jr. | 126/9 B X |
| 3,109,420 | 11/1963 | Ott et al. | 126/9 |
| 3,682,154 | 8/1972 | Mollere | 126/9 A |
| 3,892,222 | 7/1975 | Darbo | 126/9 R |
| 4,211,206 | 7/1980 | Darbo | 126/9 R |
| 4,524,751 | 6/1985 | Hoglund | 126/9 R X |

Primary Examiner—Larry Jones

[57] ABSTRACT

A new type of portable, collapsible wood burning stove that can be easily disassembled and assembled for use with very small pieces of wood or coal and when so used is environmently efficient comprising relatively small front and back metal plates having along both sides a cut out slot extending from the bottom edge, two other plates having along both sides a cut out slot extending from the top edge, the front and back plates being removably joined to the side plates to form a box structure by having the cut out slots of the front and back plates inserted down into the slots of the other plates, the height of the front and back plates being adjust so that their top edges are above the edges of the other plates and air space remains below the bottom edge of the of such plates, a metal grate and ash pan being inserted inside the box structure and held in place by protruding elements from the side plates, and method for using the same.

9 Claims, 4 Drawing Sheets

PORTABLE, COLLAPSIBLE WOOD BURNING STOVE AND USES FOR THE SAME

BACKGROUND OF THE INVENTION

1. Field of the Invention

This invention relates to a new type of outdoor stove which is easily carried and packed and can be easily disassembled and assembled for used in the burning of small pieces of wood and the like, said stove having many unique and special advantages.

Specifically, the invention provides a new type of outdoor portable stove which can be easily disassembled for storage and easily reassembled for supporting cooking utensils placed oh the said stove and heated by heat sources such as burning wood chips and the like, and when so used is environmentally efficient in that its use leaves no impact on the surface on which the stove is placed and leaves no large quantities of ash from the burning of the heat source. The new stoves broadly comprise in combination front and back metal plates having along both sides a cut out slot extending from the bottom edge, two other plates, preferably about the same size, having along both sides a cut out slot extending from the top edge, the front and back plates being removably joined to the side plates to form an open box type structure by having the cut out slots of the front and back plates inserted down into the slots of the other plates, the height of the front and back plates being adjusted so that their top edges are above the top of the other plates and an air space remains below the bottom edge of such plates, a metal grate fitting inside the box structure, preferably near the bottom, an ash pan also fitting inside the box structure below the grate, and means protruding through the side plates to provide support for the grate and ash pan.

The invention further provides a modification of the above-noted stove assembly which can be used to provide heat for a reflector oven, said modification being such that the front plate is removed and placed preferably on the top edge of the back plate as noted hereinafter, and a metal bar or rod is inserted in the side slots in place of the front plate.

2. Prior Art

Heating, cooking food, and heating fluids in the field has always presented problems. The campers and hikers have only limited space and weight which can be devoted to the cooking equipment, yet such needs are essential if the person is subject to severe environmental conditions. Many outdoor areas now forbid the use of open camp fires because of fire danger and the damage to the environment. In many cases the open camp fires leave large burnt spots and piles of ashes that seriously affect the appearance and use of the area.

In addition, there is a problem of supplying fuel for the cooking equipment if it is to be used for an extended period of time. In general, the fuel must be packed in with the camper because in many areas the cutting down of trees and foliage is forbidden in order to protect the area. As most fuels are bulky and heavy to carry, this adds considerable weight to any material that is to be brought in by the camper or hiker.

There is also a growing need for improving outdoor cooking equipment for preparedness kits in the case of a major disaster such as an earthquake or fire. In this case, families may have to leave their home and go to protected areas or to even live in tents, etc. just outside their home until the home can be reestablished. In the meantime, food must be provided for the family members on outdoor cooking equipment which must be readily available with a supply of fuel. As movement may be involved, it is important that the cooking equipment be light in weight, portable and easily assembled.

Attempts have been made in the past to develop cooking equipment which meet the above needs, but they have always had limitations which have prevented their wide acceptance. U.S. Pat. No. 4,794,906, U.S. Pat. No. 4,508,096, U.S. Pat. No. 4,492,215, U.S. Pat. No. 3,447,530 and U.S. Pat. No. 4,140,099, disclose collapsible or foldable stoves but they are either too difficult to assemble, require the use of heavy steel plates which make them too heavy to carry for long distances, or require the use of special fuel, such as briquettes, fuel pellets, or cells, which are sometimes difficult to find and have limited time use.

It is an object of the invention, therefore, to provide a new type of outdoor portable stove. It is a further object to provide an outdoor stove which is light weight and can be easily assembled and disassembled in a short period of time. It is a further object to provide a fuel efficient portable stove which gives a great amount of heat from burning small amounts of fuel. It is a further object to provide an outdoor portable stove which when used leaves no impact on the environment. It is a further object to provide an outdoor stove which can be used for all types of cooking, such as frying, boiling, roasting and the like. It is a further object to provide a portable stove that can, when disassembled, fit into a small storage bag that can be easily stored. It is a further object to provide a new type of portable outdoor stove that can be produced economically. These and other objects will be apparent from the following detailed description thereof.

SUMMARY OF THE INVENTION

It has now been discovered that these and other objects can be accomplished by the new portable, collapsible outdoor cooking stoves of the present invention which provide for the first time a light weight, fuel efficient and environmental impact free stove for the use in the outdoors.

The new stoves of the present invention broadly comprise in combination a front and back metal plate having along both sides a cut out slot extending from the bottom edge, two other plates, preferably about the same size, having along both sides a cut out slot extending from the top edge, the front and back plates being removably joined to the side plates to form an open box type structure by having the cut out slots of the front and back plates inserted down into the slots of the other plates, the height of the front and back plates being adjusted so that their top edges are above the tops of the other plates and an air space remains below the bottom edges of such plates, a metal grate fitting inside the box structure, preferably near the bottom, an ash pan also fitting inside the box structure below the grate, and means protruding through the side plates to provide support for the grate and ash pan.

The new stoves of the present invention are utilized by assembling the plates as noted above, placing the grate in the protrusions inside the box and the ash pan under the grate, and then placing small wood chips or other small portions of a fuel supply on the grate, igniting the chips or other fuel supply and then placing the utensil containing the material to be heated on top edges of the front and back plates. When the cooking has been completed and the stove no longer in use, the ash pan can be removed by pulling it out from the front or back end of the stove and the small amount of ashes remaining placed in a trash container, buried, or distributed. The stove can then be quickly and easily disassembled by removing the grate and pan, separating the four plates and placing them together in a thin stack which can be easily placed within a small storage bar for future use.

The new stoves of the present invention possess many new and unique advantages not possessed by the prior known stoves. The stove can, for example, be produced in very small size, e.g. from 3 to 10 inches, and yet can be used to produce sufficient heat for all cooking purposes. Their small size and use of light weight metal permit the stoves to be very light in weight so they can be easily transported in back packs and the like without any concern for the added weight. The arrangement of the parts is such that when disassembled the parts can be easily stacked together and placed in a small bag which requires little space in the back pack or other storage container.

A further advantage to the new stoves is that they can be used to burn material that is readily available in the area and does not require one to carry the fuel along with the other material in the back pack or vehicle. The stoves can, for example, be used to burn small pieces of wood, such as small pieces of bark and tree limbs which are always available. When such materials are burned the flames are well controlled within the stove and provide sufficient heat for some purposes. The stove is thus very fuel efficient and provides large amounts of heat from a small amount of fuel. The stove can, for example, boil a gallon of water in just 30 minutes using such heat source. Boiling, frying and roasting can all be easily accomplished.

Furthermore, the use of the stove leaves no impact on the environment. The ash pan keeps all burned material off the ground and leaves no large burned spots or large pile of ashes to destroy the appearance of the wooded areas. The small amount of ashes remaining can easily be placed in a small container or distributed by throwing the ashes to the wind. This special advantage of the stoves makes them very attractive for scouters and other hikers interested in going to highly restricted forest areas, or motor home campers who go to improved camp grounds or parks.

As noted above, a further advantage of the new stoves is that they can be modified to be used with reflector ovens. In this case, the front plate is removed and slipped, by use of the slots, onto the top edge of the back plate, or alternatively by slipping the front plate down on the side plates in front of the back plate.

DESCRIPTION OF THE DRAWINGS

The various objects and features of the present invention will be more fully understood by reference to the accompanying drawings.

With reference to FIG. 1 which illustrates a typical stove assembly, the front plate is shown as 12, the back plate as 13, the two side plates are shown as 14 and 15. The ash pan within the stove assembly is shown as 17. The screw inserts for support for the grate (not shown) are shown as 19, the screw inserts for the ash pan are shown as 18. The vent holes in the plates are illustrated as 16.

With reference to FIG. 2 which illustrates a modification of the stove assembly to be used with a reflector oven, the front plate which has been moved and slid down in front of the top of the back plate 13 is shown as 12, the metal bar put in place of the front plate and placed in the slots in the side plates is shown as 20. The side plates are shown as 14 and 15, the grate is shown as 21, the ash pan as 17, the screw supports for the grate as 19 and the screw supports for the ash pan as 18. The vent holes in the sides and back and front plate are shown as 16.

With reference to FIGS. 3A and 3B which are front views of the plates used in the stove assembly, the front and back plates are illustrated by 12, with the open slots cut from the bottom edge up the sides shown as 22A, and the vent holes as 16. The side plates are shown in FIG. 3B as 15 with the open slots cut from the top edge parallel to the sides shown as 22, the holes for the screws to support the grate are shown as 19 and the holes for the screws to support the ash pan are shown as 18. The vent holes are shown as 16.

With reference to FIG. 4, a typical ash pan is shown as 17 with the L shaped edges shown as 17A. A typical grate is shown as 21 in FIG. 5, and in FIG. 6 a typical option grill is shown as 23.

With reference to FIG. 7 which is a front view of the stove assembly, the front plate is shown as 12, the two side plates as 15 and 16, the ash pan as 17, the screw means for supporting the pan as 18 and 18A, the location of the grate shown by the dotted lines as 21 and the screw means for supporting the grate as 19 and 19A. The vent holes are shown as 16.

While FIG. 7 illustrates the front view, it can also be said to illustrate the back view where the front plate 12 can be replaced with the back plate 13.

With reference to FIG. 8 which is a top view of the stove assembly, the top edge of the front plate is shown as 12, the top edge of the back plate as 13, the top edge of the side plates as 14 and 15. The grate is shown as 21 supported by screw means 19 and 19A, and the pan is shown as 17 supported by screw means 18 and 18A.

With reference to FIG. 9 which is another front view of the stove assembly illustrating a different location of the grate and different means for supporting the grate, the front plate is shown as 12, the side plates as 14 and 15, the grate shown by the dotted lines is represented by 21, the rods used to support the grate as 24, and the ash pan as 17, supported by rod 25. The vent holes are shown as 16.

DETAILED DESCRIPTION OF THE INVENTION

Figure 1:
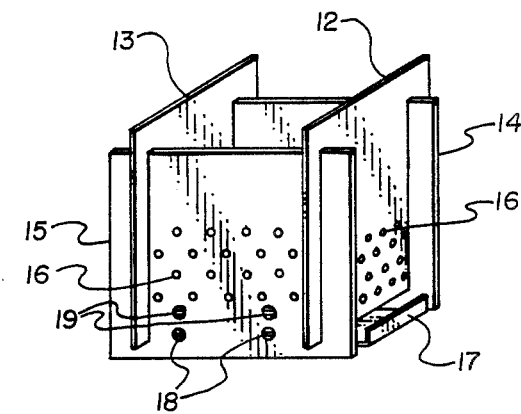
FIG. 1 is a perspective view of one example of the new stove as assembled.
Figure 2:
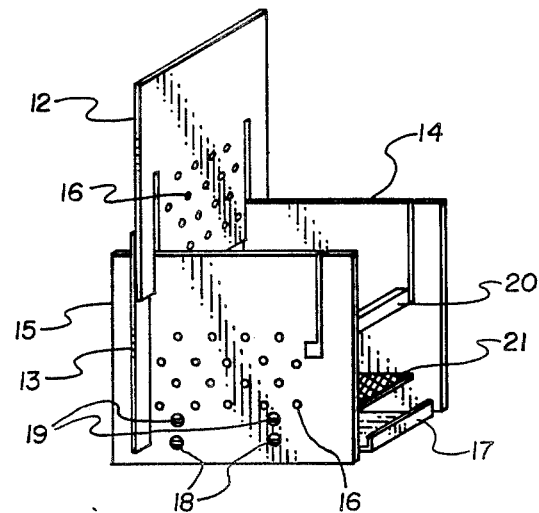
FIG. 2 is a perspective view of a modification of the new stove assembly which can be used with a reflector oven.
Figure 3A:
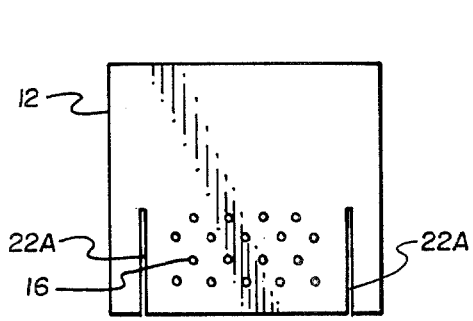
FIG. 3A is a front view of the front and back plates used in the new stove assembly.
Figure 3B:
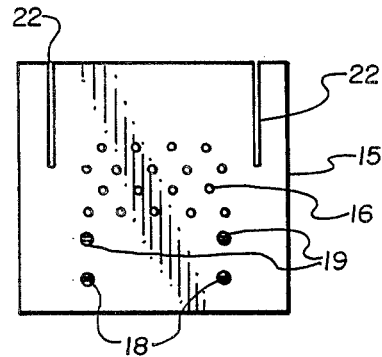
FIG. 3B is a front view of the side plates of the new stove assembly.
Figure 4:
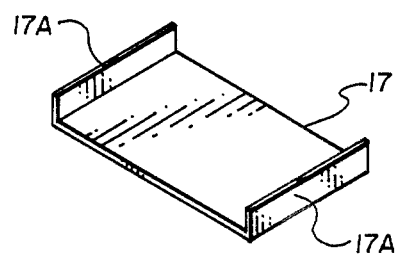
FIG. 4 is a perspective view of a typical ash pan used in the stove assembly.
Figure 5:
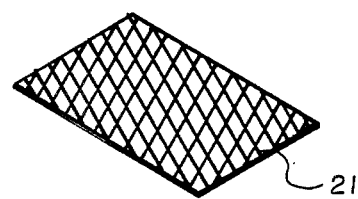
FIG. 5 is a perspective view of a typical grate used in the stove assembly.
Figure 6:
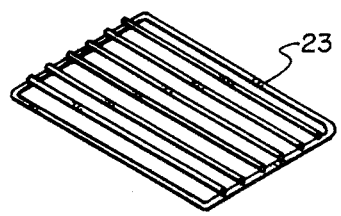
FIG. 6 is a perspective view of a typical grill that can be used in the new stove assembly.
Figure 7:
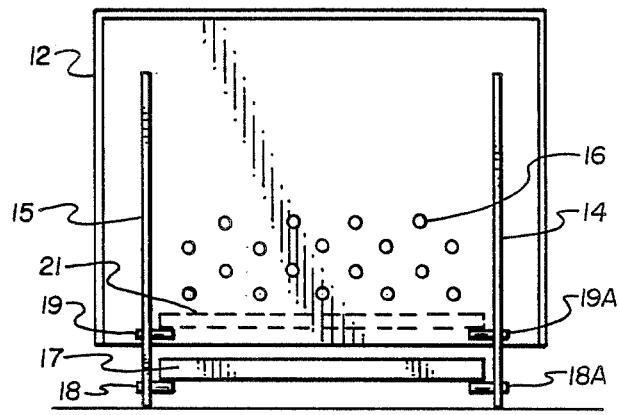
FIG. 7 is a front view of the new stove assembled.
Figure 8:
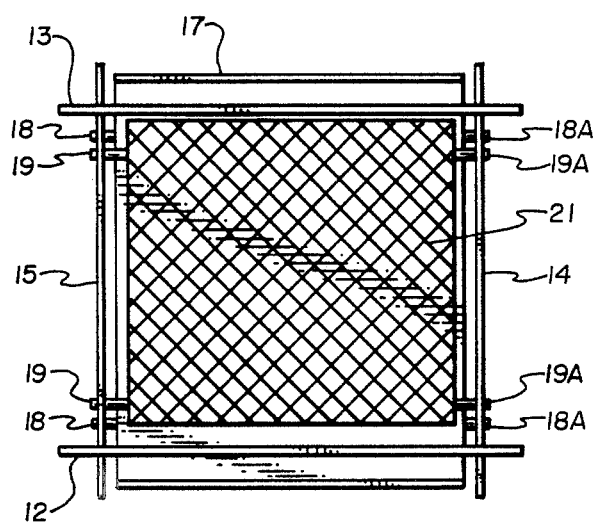
FIG. 8 is a top view of the new stove assembly.
Figure 9:
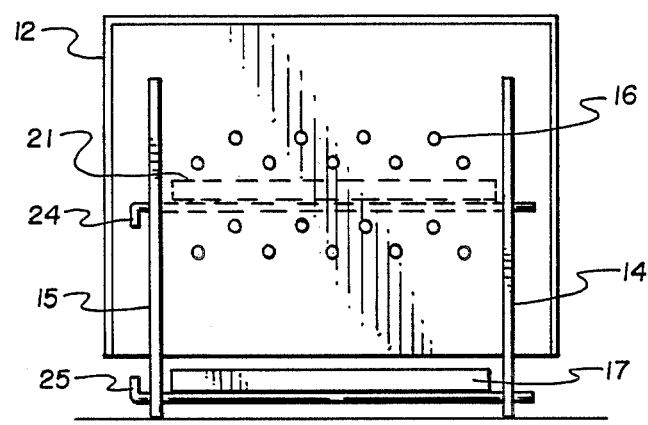
FIG. 9 is a front view of the new stove assembly illustrating the different location of the grate and different means for supporting the grate.

While the above-described description of the invention and the attached drawings have been made in rather specific terms, it should be understood that various changes can be made in construction and use without departing from the scope of the invention.

The plates use in making the new stove assembly can be of any size. As noted, a great advantage of the present invention is that the stoves can be made in very small or large size. Generally, the plates may vary from about 3 inches up to about 15 or more inches. For use by hikers, scouters and recreational vehicle operators the preferred sizes generally varies from about 4 to 10 inches.

The plates may be equal in size or may differ in size, although for ease of assembly it is important that the front and back plates are the same size and the side plates should be the same size. Generally, all four sizes are equal making the stove into the shape of a square, but it also may be in the form a rectangle as desired.

The material used in preparing the metal plates may be of any suitable material, but to gain the most from the advantage of being light weight, it is preferred to use aluminum plates, although other metal plates can be used.

As noted slots are cut out of the plates along the sides as shown in the drawings. Generally, the slot is about $\frac{1}{8}$ inches in width and is about $\frac{1}{3}$ the height of the plates. Thus, with plates of about $6 \times 6$ inches, the slot is cut about $2\frac{1}{4}$ inches up from the bottom for the back and front plates, and the same size slot down from the top for the two side plates. The slots are generally placed about $\frac{1}{2}$ to 1 inch from the sides.

The plates preferably contain vent holes to assist in air control. The number of vents may vary as needed for the particular size of the stove. For example, with the smaller size stoves one may utilize more vent holes than with the larger size stoves such as those from 10 to 15 inches. The number of holes may vary in most cases from about 3 to 20 per plate to about 3 to 30. The size of the vent holes may also vary but preferably range from about $\frac{1}{4}$ to $\frac{3}{8}$ inches in diameter.

The side plates also provide means for supporting the grate and the ash pan. This support may consist of extruded portions of the plate or holes where screws, bolts or rods may be introduced to support the edges or the whole grate or pan.

The grate used in the stove assembly may be of any size or texture as long as it is capable of fitting inside the stove as shown in the drawings. The grate preferably has openings varying from about $\frac{1}{4}$ to 1 inch in width and length, and is preferably prepared from light weight metal such as expanded metal, steel and the like.

The ash pan can also be of any size and material as long as it is capable of fitting inside the stove as shown in the drawings. The front and back ends are preferably turned up in L shape fashion so as to help keep the ashes within the pan as well as to provide an edge or lip for easy removal of the pan. If the pan is still hot, the lip facilitates the use of forceps to remove the pan.

The fuel used in the operation of the stove can also vary as needed. As noted, a special advantage of the stove is that one can utilize very small pieces or chips of wood or bark and twigs as the fuel source. Of course, other materials, such as briquettes, fuel pellets, coal and the like can also be utilized.

The stoves can also be utilized for barbecuing. In that case grills as shown in the drawings are placed over the top edge of either the front or back plates or the side plates and briquettes are used as the fuel source.

As used herein "front", "back" and "side" in relation to the plates are used only to facilitate description of the parts of the stove and do not denote any special relationship other than for the description.

The following examples are given to illustrate the new wood burning stoves of the present invention. It is to be understood, however, that the examples are given only for the purpose of illustration and do not limit the invention in any way.

EXAMPLE I

This example illustrates the preparation of a wood burning stove having a width, length and height of about six inches.

Four metal plates were cut out of 0.090, 3003 H14 alloy aluminum having a size of about $6 \times 6$ inches. Two of the plates designated as the front and back plates were further treated to cut an $\frac{1}{8}$ inch slot about $2\frac{1}{4}$ inches long from the bottom edge and about $\frac{1}{2}$ inches from the side edge.

The other two plates designated as the side plates were also further treated by cutting a $\frac{1}{8}$ inch slot about 2 inches long from the top edge and about $\frac{1}{2}$ inch from the side edge.

Four rows of $\frac{3}{8}$ inch vent holes were placed in all four plates starting at about 3 inches from the bottom edge of the plates as shown in the drawings.

Two holes for introduction of $\frac{3}{8}$ inch screws were placed in the side plates about $\frac{1}{2}$ inches above the bottom edge to provide support for the grate. Two additional holes for introduction of $\frac{3}{8}$ inch screws were placed in the side plates about $\frac{1}{2}$ inch above the bottom edge to provide support for the ash pan.

A grate having a size of $4\frac{3}{4} \times 4\frac{3}{4}$ inches was prepared from expanded metal material having open pore size of about $\frac{1}{2}$ inch. This grate was placed inside the stove so that it rested on screws placed through the side plates as noted above.

An ash pan was prepared from solid plating of galvanized steel having a size of $4\frac{5}{8}$ inches $\times 6\frac{1}{2}$ inches with the front and back edges bent upwards to form a $\frac{1}{2}$ inch retaining ledge. The pan so prepared was placed inside the stove so that it rested on the screws placed through the side plates as noted above.

The portable stove prepared as above was then used to burn small wood pieces and used to heat a pan of water placed on the top edges of the front and back plates. Wood pieces of about 1 to 5 inches long by 1 to 3 inches wide were placed on the grate and ignited. Additional pieces were placed on the ignited wood pieces as needed. Within a short time, the water was boiling.

On cooling, the stove could be easily disassembled and placed in a small canvas bag for storage.

EXAMPLE II

This example illustrates the conversion of the portable stove produced in Example I to be used with reflector oven to bake food materials, such as biscuits and the like.

The front plate of the portable stove shown in Example I was removed and a $\frac{1}{2}$ inch aluminum bar was placed in the slots of the side plates replacing the front plate. The front plate was then placed on top of the back plate by slipping the open slots down over the top edge of the back plate.

A conventional reflector oven was placed in front of the modified stove, and wood pieces were placed on the grate of the stove and ignited. In a short while the generated heat was reflected back to the oven and effected the baking of the material in the oven.

EXAMPLE III

This example illustrates the conversion of the portable stove in Example I to a barbecue grill.

A metal grill of about 6×6 inches was placed on the top edges of the front and back plates and briquettes placed on the grate below. The briquettes were lighted and meat placed on the grill. Within 20 minutes the meat had been cooked to the desired taste.

EXAMPLE IV

This example illustrates the use of skewers in the cooking of food material over the new stoves of the present invention.

Several skewers containing pieces of chicken, and potatoes wrapped in tin foil were placed on the top edges of the front and back plates of the stove prepared in Example I. Briquettes were placed on the grate and lighted. After just a short period, the material on the skewers had been cooked to taste.

I claim as my invention:

1. A portable, collapsible wood burning stove comprising in the assembled condition:
   a. a front and back metal plate both having a top and bottom edge and two side edges and having an elongated cut out slot extending from the bottom edge part way up the plate paralleling the side edges,
   b. two side metal plates both having a top and bottom edge and two side edges and having an elongated cut out slot extending from the top edge part way down the plate paralleling the side edges,
   c. the front and back metal plates being removably joined to the side plates to form a box type structure by having the elongated cut out slots of said front and back plates inserted into the cut out slots of the side plates,
   d. the height of the front and back plates being adjusted so that the top edge of the said front and back plates are above the top edge of the side plates and air space is provided below the bottom edge of the front and back plates,
   e. a metal grate fitting between the two side plates,
   f. a solid metal ash pan fitting between the two side plates and below the said grate but above the bottom edge of the side plates,
   g. and means protruding through the side plates to provide support for the above noted grate and ash pan.

2. A stove as in claim 1 wherein the four plates have a size varying from 3 to 10 inches and each side has a plurality of vent holes in the middle section thereof.

3. A stove as in claim 1 wherein the four plates have a size varying from about 10.1 to 15 inches and there are a plurality of vent holes in at least the two side plates.

4. A wood burning stove as in claim 1 wherein the metal plates are prepared from aluminum sheeting.

5. A wood burning stove as in claim 1 wherein vent holes are contained in at least one of the four metal plates.

6. A wood burning stove as in claim 1 wherein the protruding means to support the grate and ash pan comprise screw means introduced through the outside of the two side plates.

7. A wood burning stove as in claim 1 wherein a grill plate is placed on top of the top edges of the front and back plates.

8. A modified wood burning stove as in claim 1 wherein the front metal plate is removed and attached by means of the cut out grooves to the top of the side plates in front of the top edges of the back plate, and a metal bar is placed in the grooves of the side plates in place of the front metal plate.

9. A process for using the stove as defined in claim 1 which comprises placing a fuel source on the grate, igniting the fuel source and then placing the cooking utensil on the top edges of the plates and allowing the generated heat to effect the desired cooking.

* * * * *